(12) United States Patent
Friedrich et al.

(10) Patent No.: US 9,454,141 B2
(45) Date of Patent: Sep. 27, 2016

(54) REAL TIME CAPACITY MONITORING FOR MEASUREMENT AND VERIFICATION OF DEMAND SIDE MANAGEMENT

(71) Applicant: Innovari, Inc., Austin, TX (US)

(72) Inventors: Loran Friedrich, Portland, OR (US); David Walden, Long Beach, CA (US); Chris Hickman, Austin, TX (US); Laura V. Raymond, Houston, TX (US); James Tillett, Portland, OR (US); Eric Pierce, Portland, OR (US); John Whalen, Austin, TX (US)

(73) Assignee: INNOVARI, INC., Austin, TX (US)

( * ) Notice: Subject to any disclaimer, the term of this patent is extended or adjusted under 35 U.S.C. 154(b) by 0 days.

(21) Appl. No.: 14/730,777

(22) Filed: Jun. 4, 2015

(65) Prior Publication Data
US 2015/0355650 A1     Dec. 10, 2015

Related U.S. Application Data

(60) Provisional application No. 62/009,045, filed on Jun. 6, 2014.

(51) Int. Cl.

| | | |
|---|---|---|
| *G05D 23/19* | (2006.01) | |
| *G05B 15/02* | (2006.01) | |
| *G06Q 10/04* | (2012.01) | |
| *G06Q 10/06* | (2012.01) | |
| *H02J 3/00* | (2006.01) | |
| *F24F 11/00* | (2006.01) | |

(52) U.S. Cl.
CPC ............. *G05B 15/02* (2013.01); *G06Q 10/04* (2013.01); *G06Q 10/0631* (2013.01); *F24F 11/0034* (2013.01); *F24F 2011/0075* (2013.01); *G05B 2219/2639* (2013.01); *H02J 2003/003* (2013.01); *Y04S 10/54* (2013.01); *Y04S 20/222* (2013.01); *Y04S 20/244* (2013.01)

(58) Field of Classification Search
None
See application file for complete search history.

(56) References Cited

U.S. PATENT DOCUMENTS

| | | | |
|---|---|---|---|
| 5,414,640 A | 5/1995 | Seem | |
| 7,127,330 B2 | 10/2006 | Spool et al. | |
| 7,373,222 B1 | 5/2008 | Wright et al. | |
| 8,140,193 B2 * | 3/2012 | Lee .................... | G05D 23/19 700/286 |
| 8,359,124 B2 | 1/2013 | Zhou et al. | |
| 8,560,133 B2 | 10/2013 | Venkatakrishnan et al. | |
| 8,761,953 B2 | 6/2014 | Friedrich et al. | |

(Continued)

FOREIGN PATENT DOCUMENTS

| | | |
|---|---|---|
| WO | WO-9414279 A1 | 6/1994 |
| WO | WO-2007060669 A2 | 5/2007 |
| WO | WO-2010069316 A1 | 6/2010 |

OTHER PUBLICATIONS

International Search Report for International Application No. PCT/US2015/034230, dated Jan. 21, 2016.

*Primary Examiner* — Sean Shechtman
(74) *Attorney, Agent, or Firm* — Parsons Behle & Latimer

(57) ABSTRACT

Systems are described that provide monitoring for control, measurement and verification of demand side management resources. Control units deployed among customer or utility premises can monitor capacity as real or reactive power that is consumed, generated or stored by resources and, in some cases, selectively alter the load consumed or energy delivered by some or all of such resources derived from load capacity and dispatch models. Related apparatus, systems, techniques and articles are also described.

16 Claims, 14 Drawing Sheets

(56) References Cited

U.S. PATENT DOCUMENTS

| | | |
|---|---|---|
| 2004/0204772 A1 | 10/2004 | Maturana et al. |
| 2005/0192713 A1 | 9/2005 | Weik et al. |
| 2006/0276938 A1 | 12/2006 | Miller |
| 2007/0021874 A1 | 1/2007 | Rognli et al. |
| 2008/0177423 A1 | 7/2008 | Brickfield et al. |
| 2009/0062969 A1 | 3/2009 | Chandra et al. |
| 2009/0157529 A1 | 6/2009 | Ehlers et al. |
| 2010/0138363 A1 | 6/2010 | Batterberry et al. |
| 2010/0292856 A1 | 11/2010 | Fujita |
| 2011/0066300 A1 | 3/2011 | Tyagi et al. |
| 2011/0208365 A1 | 8/2011 | Miller |
| 2011/0208366 A1 | 8/2011 | Taft |
| 2011/0251732 A1 | 10/2011 | Schweitzer, III et al. |
| 2011/0270452 A1 | 11/2011 | Lu et al. |
| 2012/0072039 A1 | 3/2012 | Anderson et al. |
| 2012/0078432 A1 | 3/2012 | Weatherhead et al. |
| 2012/0136496 A1 | 5/2012 | Black et al. |
| 2012/0143385 A1 | 6/2012 | Goldsmith |
| 2012/0239216 A1 | 9/2012 | Kulathu et al. |
| 2012/0310435 A1 | 12/2012 | Taft |
| 2013/0096727 A1 | 4/2013 | Brandt et al. |
| 2013/0268136 A1 | 10/2013 | Cox et al. |
| 2014/0222225 A1* | 8/2014 | Rouse ............... H02J 13/0079 700/291 |
| 2014/0222238 A1 | 8/2014 | Friedrich et al. |

\* cited by examiner

REAL TIME CAPACITY MONITORING FOR MEASUREMENT AND VERIFICATION OF DEMAND SIDE MANAGEMENT

RELATED APPLICATION

This application claims priority under 35 U.S.C. §119 to U.S. provisional patent application No. 62/009,045 filed Jun. 6, 2014, the entire contents of which are hereby expressly incorporated by reference herein.

TECHNICAL FIELD

The subject matter described herein relates to a platform providing real time capacity monitoring for measurement and verification of demand side management.

BACKGROUND

Demand Side Management (DSM) is a phrase that is used to characterize any process to change the timing or amount of energy delivered through a utility system grid by altering or shifting the use of energy, altering the demand of individual loads, storing energy in electrical or thermal form, managing generation, or any combination of these or other processes on either the customer side of the meter or as directly connected to the utility grid. DSM is most often utilized to minimize peak demand on the utility grid but can be applied at any hour of any day as required to improve or optimize the utilization of utility system grid operations. Conventional techniques for measuring the results of DSM utilize electric meter readings which are typically retrieved once per month. Study of the prior electric meter readings may reflect how or if load was managed across a grid during a previous DSM event. Such analyses often illustrate errors or inadequacies that occurred during the previous event, but which are too late to address.

SUMMARY

In a first aspect, data is received that characterizes a present operating status of each of a plurality of load consuming resources within a plurality of buildings and ambient temperature within such buildings. Each resource is remotely controllable in relation to its load consuming activities. An amount of potential load adjustment can be estimated for each resource using one of a plurality of load capacity models and derived from the received data. The load capacity models can be derived from coordinating testing of historical observations demonstrating how consumed load varies for each resource due to changes in ambient air temperature and building occupancy. A length of time that an amount of load being consumed by the resource can be reduced can also be estimated for each resource using one of a plurality of dispatch models and derived from the received data. The dispatch models can be correlated to changes in ambient air temperature. Thereafter, an effective and aggregate load adjustment for the resources is derived from the first estimating and the second estimating. Data can then be provided that characterizes the effective and aggregate load adjustment for the resources.

In some variations, data can be received that characterizes the present operating status of each of a plurality of load consuming, generation, or energy storage resources within a plurality of locations and any relevant data which may affect the operating status of these resources. Each resource is remotely controllable in relation to its load consuming, generation or energy storage activities. An amount of potential load adjustment (e.g., "capacity"), including real and reactive power, can be estimated for each resource using one of a plurality of analytical models and derived from the presently received or historic data. Analytical models can be derived from historical observations or coordinated testing results. A length of time can be calculated that reflects the potential load alteration of any individual resource, or combination of resources using one of a plurality of dispatch models and derived from the received data. The dispatch models may include a plurality of related data such as changes in ambient air temperature. Thereafter, an effective and aggregate load alteration for any combination of resources is derived from the first estimating and the second estimating. The load alteration may include any combination of load adjustment, increase or reduction in load, balancing between loads and sources, load shifting, and synchronous activity for multiple different resources for any period of time. Data can then be provided that characterizes the effective and aggregate load adjustment for the resources.

It can also be determined, derived from the determined dispatch durations, which of the resources should be controlled so as to alter the total load for a specific resource or subset of resources. Operating instructions can then be transmitted to one or more of the control units to effect the load adjustment at the determined resources.

In some variations, the received data can also include temperature, humidity, or occupancy information which can be used by one or more of the load capacity models and the dispatch models.

Each control unit can include at least one processor and memory storing instructions causing data to be transmitted to one or more connected resources to cause a load consuming profile of such resources to selectively change. In addition, the control units can generated some or all of the received data that characterize the present operating status of each of the plurality of load consuming resources.

In can also be estimated, for each resource using one of a plurality of utilization models and derived from the received data, an amount of time that each resource will be used over a period of time. With such variations, the determined effective dispatch duration for each resource can be further derived from the third estimating.

The providing of data can include one or more of displaying the data characterizing the effective and aggregate load adjustment for the resources, storing the data characterizing the effective and aggregate load adjustment for the resources, transmitting the data characterizing the effective and aggregate load adjustment for the resources to a remote computing system, or loading the data characterizing the effective and aggregate load adjustment for the resources into memory.

Non-transitory computer program products (i.e., physically embodied computer program products) are also described that store and execute instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the subject matter herein provides a utility operator with much finer control and verification of load management events at the time they are occurring. This control is accomplished in part, by providing a platform that provides data collection, data monitoring, analysis and instructions to resources, and the verification of status for each end resource (load or generation) in real time. The status and capacity contribution of each individual load at a site are monitored, controlled and aggregated by the platform for presentation to the grid operator at any time, including during events. The platform continuously monitors and adjusts, effecting control of additional loads as needed, to maintain a specific capacity as requested by the grid operator throughout the event. In addition, the subject matter herein is advantageous in that it monitors the environment of customer premises in real time to ensure that pre-approved building temperatures are maintained. Furthermore, the subject matter herein enables meaningful impact estimations to determine program-level demand adjustment that has been achieved or is projected to be achieved, which can be used for ongoing program valuation and planning.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
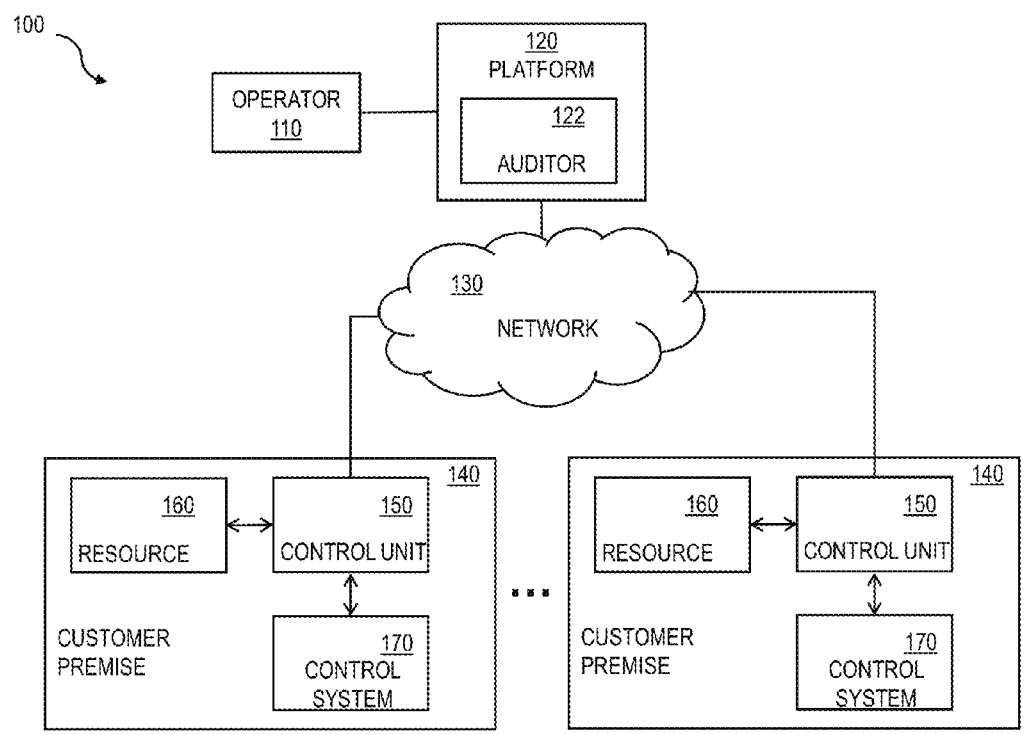
FIG. 1 is a diagram illustrating a system for implementing real time capacity monitoring for measurement and verification of demand side management.

Demand Side Management (DSM) has traditionally included activities that reduce or shift electricity usage to help improve electric grid operations. These strategies have carried a variety of names such as DSM, Demand Response (DR), Direct Load Control (DLC), Peak Load Reduction (PLR), Permanent Load Shifting (PLS), and many others. However, all are strategies to deliver an adjustment, or a shift in time, of consumer loads to manage the electrical demand for a specific area or the entire electrical grid. Additionally, to optimize the utilization of the electrical grid there may be periods of time, such as during load shifting or to balance (coordinate with) intermittent energy sources, where an increase in electrical demand is intended. Unless otherwise specified, all of the foregoing will be referred to collectively as "DSM" herein.

The subject matter herein provides systems, techniques, and computer program products to determine the load impact of a DSM event derived from the status reporting of each individual load called to participate in the event. An "event", as used herein and unless otherwise specified, refers to the adjustment of load at a specified time with a specified duration for a specified subset of the available capacity resources under control by the described system. An example event would be: 5 MW of load to be shed, over a specific geographic or electrically associated operating area, beginning at 14:00 for a duration of sixty minutes.

The subject matter herein is directed to real time capacity monitoring (RTCM) which is derived from real time monitoring of each individual load device (individual piece of equipment requiring energy to operate or ability to deliver energy for use by other equipment) operated within a customer's building or elsewhere along the electrical grid for a given DSM event period. The status and contribution of each individual load is monitored, controlled and aggregated, including continuous adjustments in the number of loads being aggregated, to deliver the amount of load adjustment and duration requested by an operator for the DSM event. Operators may also enter calculation criteria or operating thresholds within the system with the intent that the computer processing will define and generate and event without further intervention by the operator.

Capacity for a power generation plant is the amount of electricity, typically measured in megawatts (MW) or kilowatts (kW), that a traditional energy supply (plant) is capable of creating. Conversely, the instantaneous demand, which would have been used by equipment under control if a load management event had not occurred, equals a capacity which is not required to be generated, and thus "created" during the event. Additionally, any energy which can be created, such as by a distributed energy resource, or delivered from storage can be used to serve other equipment and thus also produces a capacity which is not required to be generated from a traditional energy supply. Together, any combined control request of any number of resources can be dispatched as a single, but distributed capacity to serve the needs of a utility operator.

FIG. 1 is a diagram 100 illustrating a system for real time capacity monitoring which includes a communication system among a client device/devices at an operator 110, a real time capacity and monitoring platform 120, and customer buildings (or any equipment location served by the electrical grid) 140 via a communication network 130 (e.g., the Internet, a secure communications network, a wireless network, a combination of the foregoing, etc.). The system includes control units 150 which comprise sensing and control, which may be located at a point beyond the customer meter (i.e., the meter used by the utility for each respective customer building 140) to each individual load under control within a customer building 140 (which, during a load shed becomes a "resource" or "capacity resource"). Capacity resource or resource as a term used herein can refer to each individual load under control within a customer building 140 which, when turned "OFF" (in the case of lighting), or whose thermostat set-point is increased (in the case of HVACs), or generation potential which is turned "ON", contributes a defined amount of capacity to the DSM event.

This system provides intelligence to actively monitor and learn how each resource 160 performs under a variety of operational constraints and characteristics. In addition, the system provides feedback loops to allow algorithms to aggregate any combination of resource performance(s), which together deliver the desired aggregate performance requested by the operator 110. The resulting system provides for monitoring and control over an incredibly diverse and dynamic portfolio that can change operational characteristics daily; such as operational changes resulting from a change in the number of people present within the site, ambient temperature, humidity, present operating status and equipment performance and many other factors.

Data relating to the electrical load of the resources 160 under control by the control units 150 can be reported in terms of capacity and instantaneous power consumption in kW. A load capacity model can be used that is derived from environmental factors such as outside/inside ambient air temperature/humidity and building occupancy. A capacity model characterizes the potential changes in kW usage or generation when a load or resource is turned "OFF" or "ON" due to operating variables. For example the (same) compressor unit for an air conditioner draws a different electrical current depending upon the ambient temperature in which it operates. These models can be calculated by the platform 120 for each resource 160 through coordinated testing and long term observation. Each resource 160 can have a different operating profile and a unique capacity model at any time of any day. Capacity models can include fixed load models and variable load models. Fixed load models can include a constant capacity value for a switched load such as a switched lighting circuit, or pump or energy storage system, or distributed generating device. Variable load models can represent resources 160 such as HVAC units and more complex building management systems 170. A combination of direct measurement, continuous observation, manufacturer's specification and industry accepted ASHRAE (American Society of Heating, Refrigerating and Air-Conditioning Engineers) data can be used to generate capacity models. Direct measurement in this regard can refer to an observed state change of a device either by confirming the action was taken or through supplemental measurement to confirm the requested action. Fixed load in this regard can refer to any electrical device which consumes the same amount of energy, or the same demand, over any period of time (e.g., resistive loads such as light bulbs, etc.). Variable loads can include devices that consume variable amounts of energy, or variable demand, over a period of time. The variation in energy consumption by the variable loads can be based on one or more variables (for example, HVAC systems may vary based upon time of day, temperature, humidity, operational characteristics, and the like). The building management systems 170 can include localized systems comprised of hardware and controls that are at the customer premises 140 that can control electrical loads such as lighting, heating, and air conditioning. Generation and energy storage systems can be either fixed or variable in their operating capacity.

To develop the capacity models, the control units 150 can regularly and continuously monitor and report the state of each resource 160 under control. A control unit 150 can include a real time communication and control processor installed within each customer premises or equipment location. In its simplest form, the state of a resource 160 can be reported to the platform 120 by a control unit 150 as either in the "ON" state, i.e. the resource 160 is consuming power, or "OFF", i.e. the resource 160 is not consuming power, or in the case of generation and energy storage systems, the equipment is consuming or delivering power. Other systems installed within the premises such as a Building Management System (BMS) 170 or other computerized control systems can also provide direct measurement data or operational status to the control unit 150. The observations of the control units 150, both historical and real time, can be used by the platform 120 to create resource specific models accessible by the dispatch schedule generators (at the operator 110) and the real time capacity monitor.

In concert with the capacity models discussed above, the platform 120 can associate each resource 160 with a dispatch model. These models, also derived from outside ambient temperature/humidity, describe the time duration or the expected performance each resource 160 will deliver during a future potential DSM event. In other words, the dispatch model defines the probable length of time a resource 160 can be effectively used during an event. For example, a switched load resource 160 such as lights can be dispatched for any length of time and while "OFF", delivers the same capacity (a specific kW reduction when turned "OFF") for the entire period. In particular, the dispatch model can be referred to as specifying the change in load of a device over time in response to a signal to change or in set-point. For example when increasing the set-point of an HVAC unit by 4 degrees the unit may initiate a shutdown sequence which takes some time before the unit is actually "OFF". Additionally, the control system of the HVAC unit remains active, even when the compressor is "OFF", and when the temperature in the space reaches the new set-point the HVAC control system will respond by turning the compressor back "ON", thus maintaining the airspace at the desired set-point. Algorithms can be used that learn how each HVAC resource 160 performs under a variety of operational constraints and characteristics to reflect the predicted and actual state of these resources for the planning and dispatch of events. These models can be used to compare against RTCM results for purposes of auditing and further modeling. For example, a resource can be off because of issues with the unit or other changes in conditions, which can be known using the models.

Figure 2:
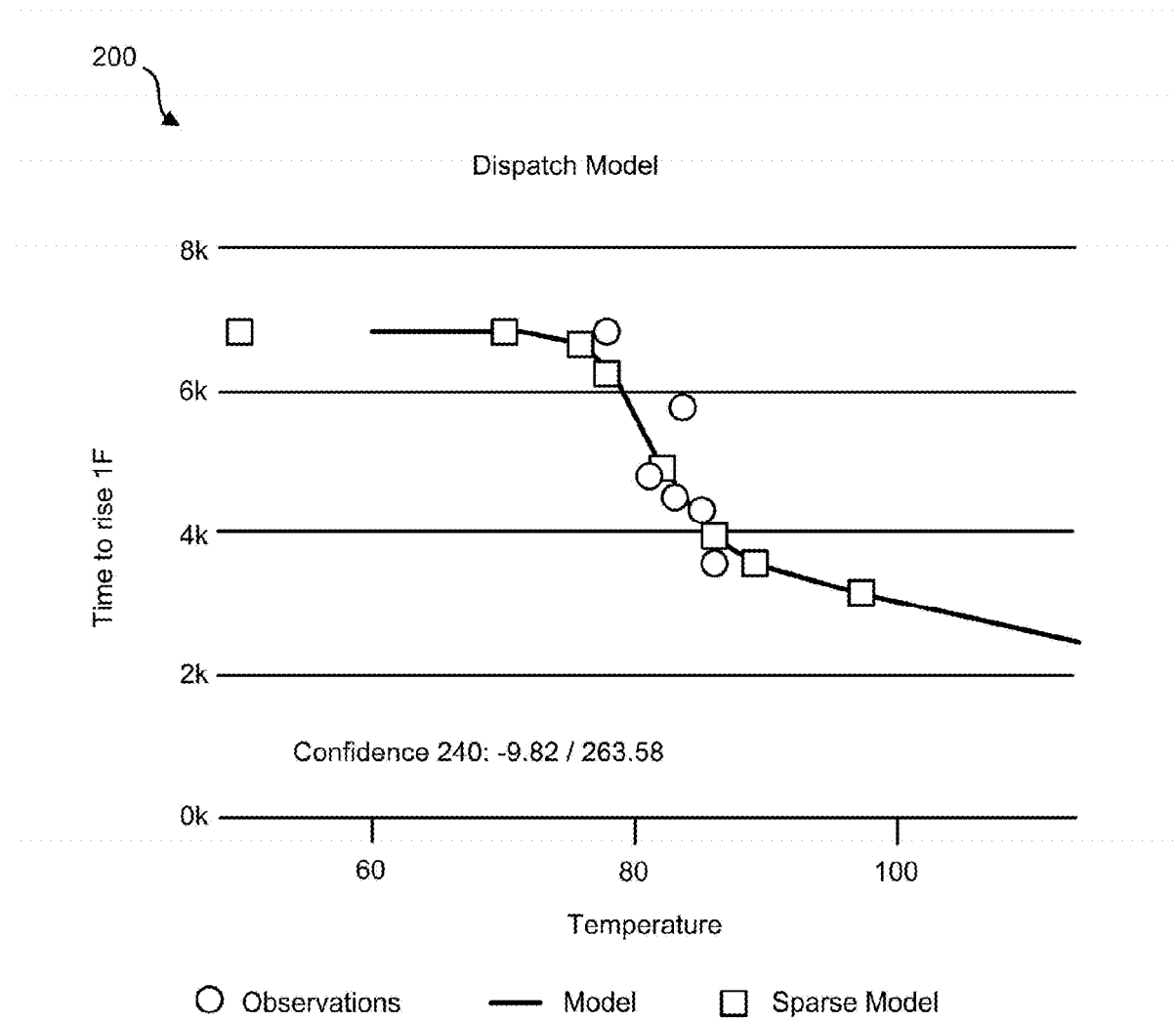
FIG. 2 is a diagram illustrating a dispatch model for an HVAC unit that enables the HVAC unit to be effectively shut "OFF" for a specific duration of time as a function of temperature.

Unlike switched (or fixed) loads, the capacity of HVAC units is variable and depends upon a number of factors such as building occupancy, ambient air temperatures, operating thermostat set-points and schedules. To minimize the operational impacts to the equipment that have their own turn down or shut down procedures, such as compressors, HVAC systems can most effectively be controlled by changing the thermostat set-points. This allows the existing control system 170 to manage any required sequence of operation for shut down, retains any timers to prevent short cycling, and permits the system to remain in its normal operating state. When considering reducing loads using HVAC units through thermostat set-point changes, the customer can pre-approve allowable changes in thermostat set-point (to be implemented by the control units 1500) so as not to significantly disrupt their business environment. Consequently, HVAC units can be controlled within pre-defined operational sequences and approved set-points. The equipment may re-engage (turn the compressor back "ON") upon reaching a set-point threshold, possibly before the full duration of the peak load shed event has completed. The dispatch model assigned to each HVAC unit or array of units can therefore be unique and defines the period of time a HVAC unit will remain "OFF" with an increase in the set-point at a given ambient temperature as illustrated in diagram 200 of FIG. 2. Similar models can be constructed for all types of resources in the system. The real-time monitoring of the HVAC status further confirms the performance during and event, and if the compressor turns back "ON" during an event, the platform 120 can adjust or call other/additional capacity resources to maintain a continuous aggregate capacity as requested by the utility operator.

Figure 3:
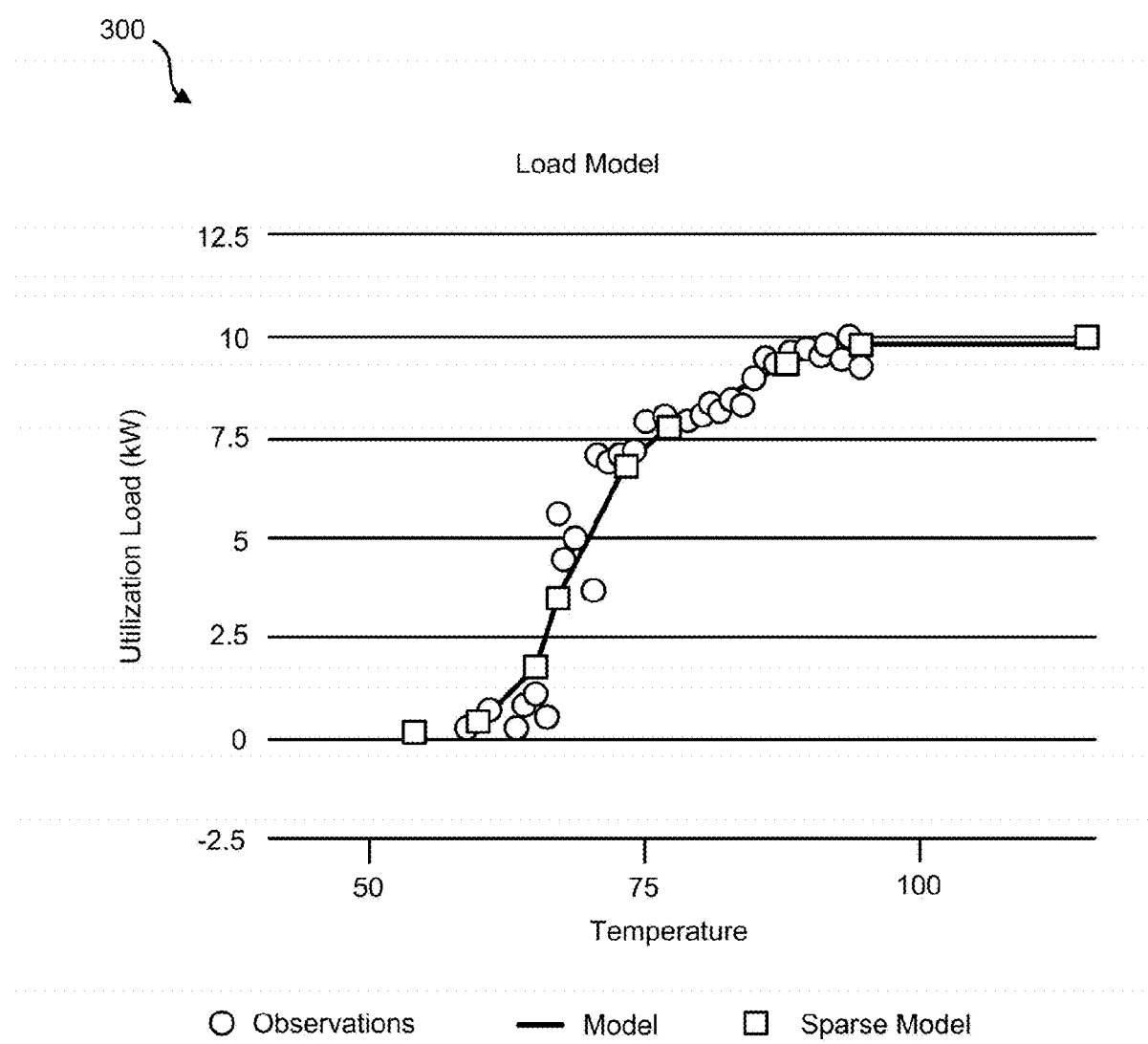
FIG. 3 is a diagram illustrating a composite load/utilization model for a select HVAC unit that predicts that the HVAC unit will be running continuously at temperatures above 100° F.

In addition, utilization models can be developed by the platform 120 for each resource 160. These models can describe ambient temperature and humidity dependent operating characteristics such as typical HVAC units cycling "ON" and "OFF" over a period of time to maintain a desired set-point. Essentially, HVAC units do not run continually and therefore the operating status can be described as a time and ambient temperature dependent probability. Each resource 160 can be assigned a utilization model, and example of which is shown in diagram 300 of FIG. 3. The utilization model is then used for capacity forecasting, DSM event resource scheduling and pre-event auditing. In particular, FIG. 3 shows that the model predicts that an HVAC unit will be running continuously at temperatures above 100° F. The platform 120 can use this utilization model, and real time equipment status by RTCM to ensure allocation and dispatch of necessary resources for a requested event and during the event to assure the aggregate capacity is delivered and maintained.

Figure 4:
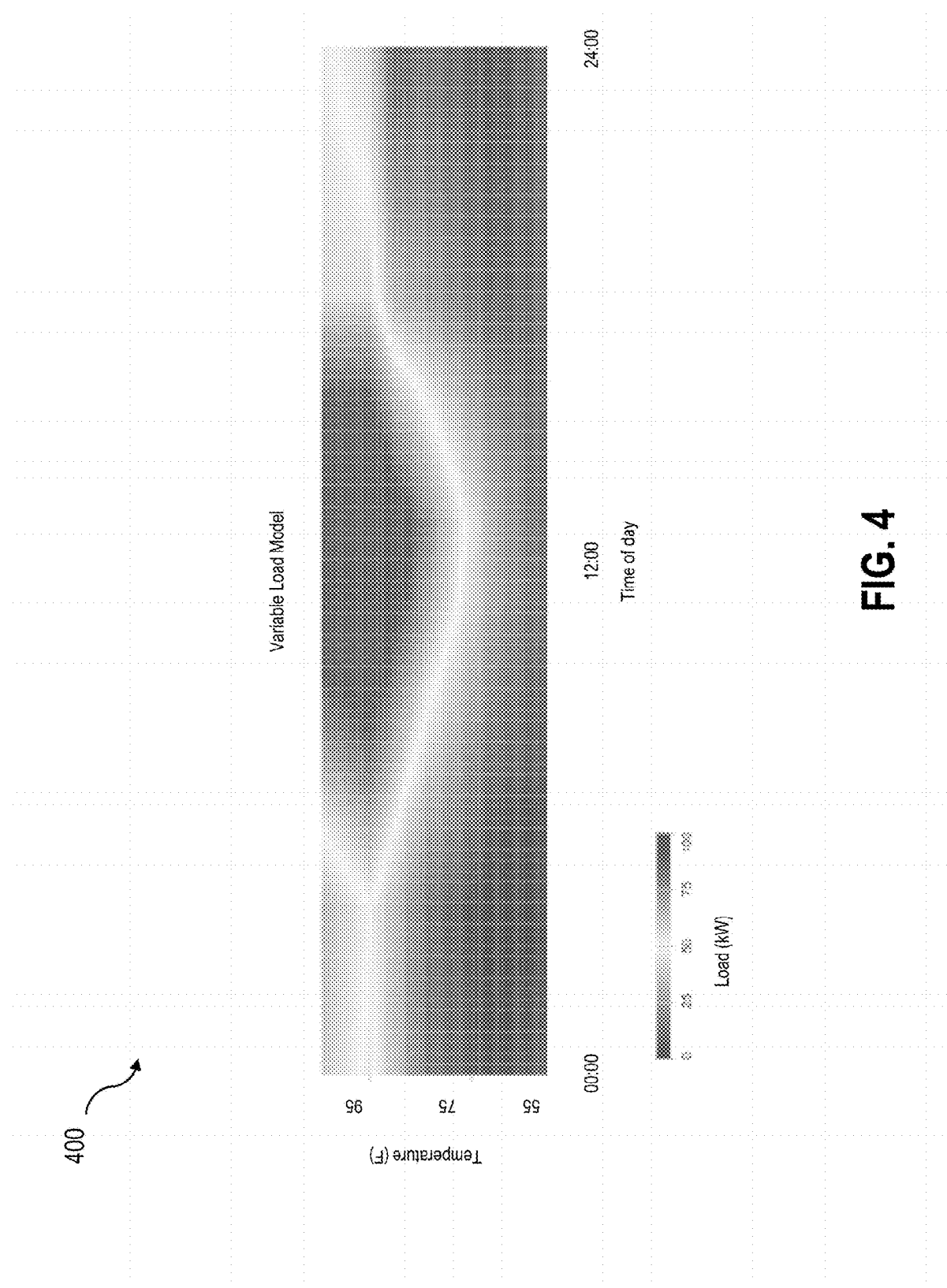
FIG. 4 is a diagram illustrating an example observation model of a variable load resource as a function of temperature and time of day.

Many resources 160 provide variable load feedback rather than a direct reading of the state of the resource load consumption (e.g., as in the example of a fixed load). Curtailment of variable loads may also result in a partial adjustment of load consumption rather than completely eliminating all power consumption (e.g., power consumption may be reduced but not eliminated). Thus modeling of these variable resource loads includes applying differences in observational baselines from actual (e.g. measured) loads to calculate curtailed capacity. The calculation of observational baselines can involve a variety of algorithms including simple averages, trend lines, and industry standard 10×3 baselines. Algorithms such as continuous observation surfaces, multivariate adaptive regression splines, radial basis functions and other surface approximations can be employed for determining observational baselines. In the calculation of baseline data for a specific time period, day of adjustments are made to the baseline. FIG. 4 is a diagram 400 of an example observation model of a variable load resource using several years of continuous 1-minute real world observations. Observation models can be adapted to multiple independent variables which enables load modeling derived from temperature, humidity, occupation states, and the like.

Figure 5:
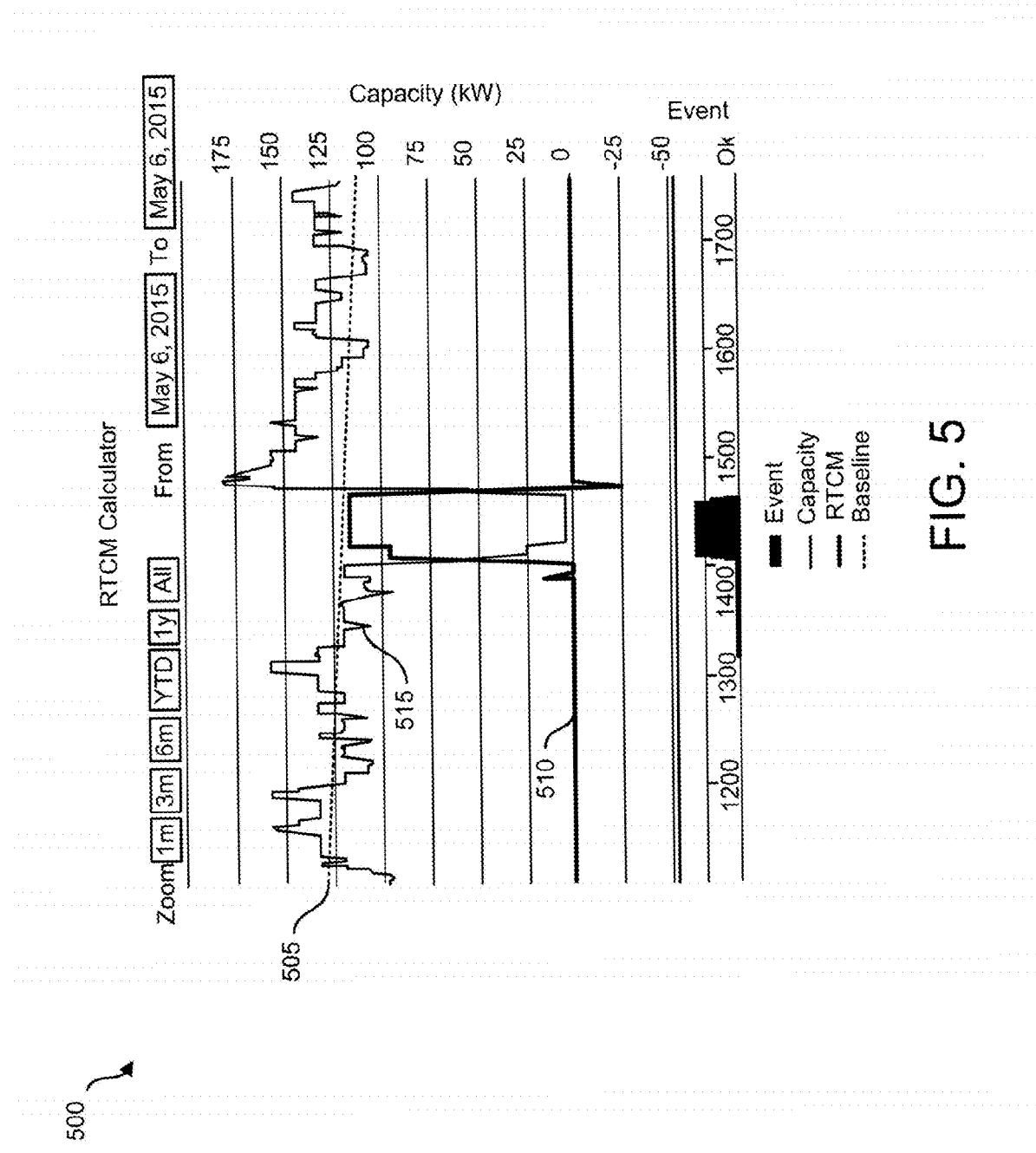
FIG. 5 is a diagram illustrating the application of a trend line baseline to a curtailment event used to monitor capacity contribution from a variable load resource.

FIG. 5 is a diagram 500 demonstrating the application of a trend line baseline to a curtailment event used to monitor capacity contribution from a variable load resource. The difference between baseline 505 and the recorded real time load 510 is the curtailed capacity 515. In the same manner as other resources, variable loads can maintain curtailment of load for a finite time. Data from the real time feedback as in 500 can provide the observations to the dispatch models for variable loads. The capacity and dispatch time calculated in this manner can be used to create predictive models as a function of time and weather, for example.

Figure 6:
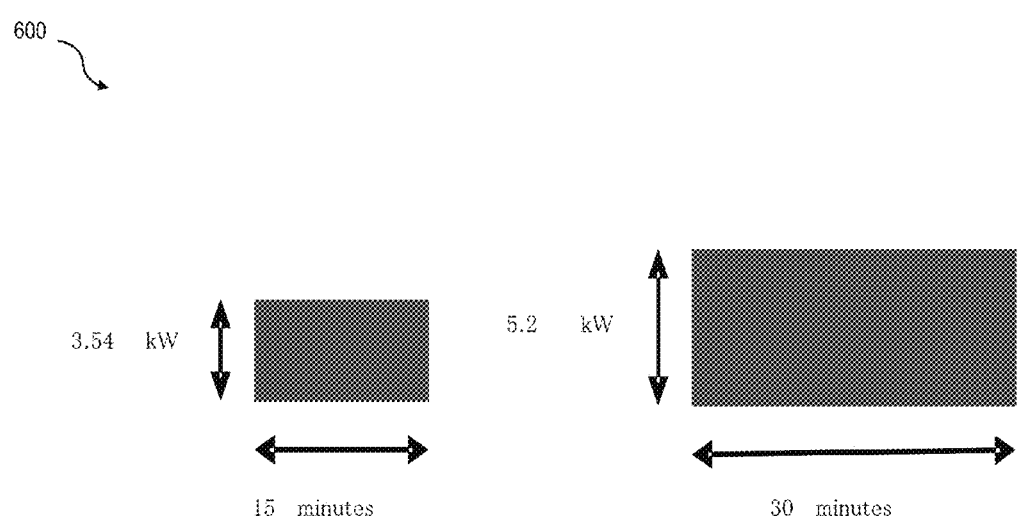
FIG. 6 is a diagram illustrating dispatch bricks for two representative resources in which the first resource sheds 3.54 kW for 15 minutes and the second resource sheds 5.2 kW for 30 minutes.

The capacity and dispatch models detailed above can be used by the platform 120 to characterize the contribution of each resource 160 to a DSM event. The models can be used together by the platform 120 to determine, as a function of temperature, the capacity and effective dispatch duration for each resource 160 under control by a control unit 150. These properties can be represented schematically as a "brick" whose height is the capacity in kW and length is the effective dispatch duration in seconds. FIG. 6 is a diagram 600 of dispatch bricks for two different resources with the first brick showing that that 3.54 kW can be shed for 15 minutes and the second brick showing that 5.2 kW can be shed for 30 minutes. These models can facilitate the predictive dispatch of resources during an event and supplement the RTCM of actual resource capacity to assure aggregate capacity is maintained.

Figure 7:
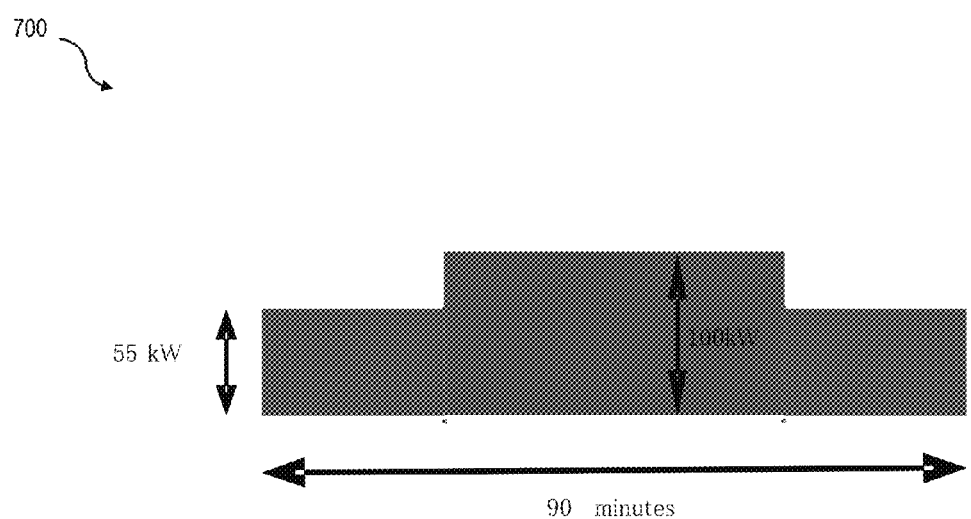
FIG. 7 is a diagram of variable load resource whose load dispatch model is represented by a "brick" presentation as illustrated in FIG. 6

FIG. 7 is a diagram 700 of a resource that consistently demonstrates variable load dispatch as a function of time during an event. In other words, when the variability of the variable load is consistent the variable load dispatch can be modeled using the "brick" modeling of FIG. 6, in which multiple "bricks" can be used to represent arbitrarily complex variable load dispatch models. In this example, the variable load is represented by the aggregate of 3 distinct bricks (separated by dotted line) each representing a load as a function of time. These composite bricks are not limited to any specific number of individual bricks and can be fashioned to form arbitrary dispatch shapes. The models and brick representation as illustrated in diagram 700 for variable loads has an associated error that can be deduced from the observations and subsequent model representation. This error can be used by an auditor 122 (which can form part of the platform 120) and for scheduling algorithms to compensate for minor deviations of observed loads from the model during select dispatch events as the nature of the curtailment is inherently variable.

Scheduling and executing a DSM event using many thousands of unique and incremental resources 160 drawn from many resource locations including potentially many customer buildings 140 (i.e., locations, etc.) under the control of many control units 150 require an algorithm to aggregate the cumulative behavior of the collection of resources 160. In other words, the platform 120 utilizes an algorithm that can manage, sequence and stack all of the bricks, in real time with no human intervention, to meet the desired result requested by the operator 110. Such algorithms can generate a diverse set of schedules for the resources 160 to be called by a control unit 150 during an event, in which the schedules do not all align at the start of the event, nor does the participation of each resource 160 last the same length of time. The aggregated behavior can be designed to maintain the specified load shed and therefore, capacity resource, for the duration of the event. In this regard, aggregated can refer to the combination of many small things in an organized manner such that the sum can be presented as a whole. The platform 120 can organize many small capacity resources such as HVAC units or lights or energy storage systems across many buildings into larger groupings which can then be presented to an operator for simultaneous control (via the control units 150).

The platform 120 can manage and refine the aggregated resource schedules with a pre-event auditor 122 (which can form part of the platform 120). In some variations, the scheduling algorithms can conduct a preliminary selection of resources 160 to use for an event derived from their actual operating state, temperature dependent capacity, dispatch and utilization models. The pre-event auditor 122 runs continuously before and during an event to ensure that resources 160 are available (i.e.: check to see that equipment is "ON" before dispatching and assuring it remains "OFF" when requested). In addition, the pre-event auditor 122 can reassign resources 160 that are not operational at the time of the event to ensure the actual capacity dispatched meets the capacity requested. Reassigned resources can either be canceled from the existing event or moved to later in the event if required. The platform 120 can implement this reassignment by the real time reporting of resource states which ensures that the DSM event meets the aggregated capacity requested.

A DSM event can require verification by the platform 120 through direct confirmation of the participating resources 160 and a real time monitoring system (as provided by the control units 150) can be required to ensure the requested dispatch capacity is indeed being delivered as expected.

Real time capacity monitoring (RTCM) as provided by the platform 120 can be used as a measurement and verification (M&V) process to verify the delivery of a capacity product during a DSM event. The operating status can be monitored by the platform 120 and recorded and the contribution of each individual resource 160 as a portion of a capacity product can be audited by the auditor 122. The visibility to the operating state of any one resource 160, combined with its contributing value, can be used by the platform 120 and relied upon as the equivalent capacity. The known operating state can be considered by the platform 120 just as viable as a metered result for each resource 160. In some cases, RTCM as provided by the platform 120 is more accurate than metering since metering is typically not found to be installed for each end resource 160, rather metering is installed for entire buildings where the continuous change of other loads (equipment not under control by the platform 120) within the building may not coincide with or represent the intended action. Additionally, RTCM as provided by the platform 120 can report more than the averaged or peak readings found in the normal interval metering of 15 to 60 minutes. The operational status of each resource 160 can be recorded at more frequent intervals during event and non-event times. The non-event related data are used for observational and active DSM testing activities for temperature dependent modeling of behavior and status. Interval metering in this regard can refer to the recording of information once per period and recording that data sequentially for analysis. A 15 minute interval meter would record desired measurements such as the consumption and instantaneous demand once every 15 minutes. More frequent intervals can be configured between the platform 120 and the control units 150 as required by the utility operators, up to and including real time communication infrastructures. The use of the term "real time" within RTCM reflects any utility operator defined requirement to meet their own measurement and verification (M&V) standards, and the capacity of the communication system defined as acceptable by the operator.

In one example, diagrams 800-1300 of FIGS. 8-13 illustrate a DSM event at only 35 kW. During a DSM event the platform 120 monitors, selects, and sequences thousands of controllable loads (from various resources 160) and aggregates them into megawatts of cumulative capacity for dispatch. Numerous and small resources 160 can be reliably verified and presented as an aggregated total to the utility within a dispatch portal. The number and size of contributing resources 160 at any point in time will vary.

Figure 8:
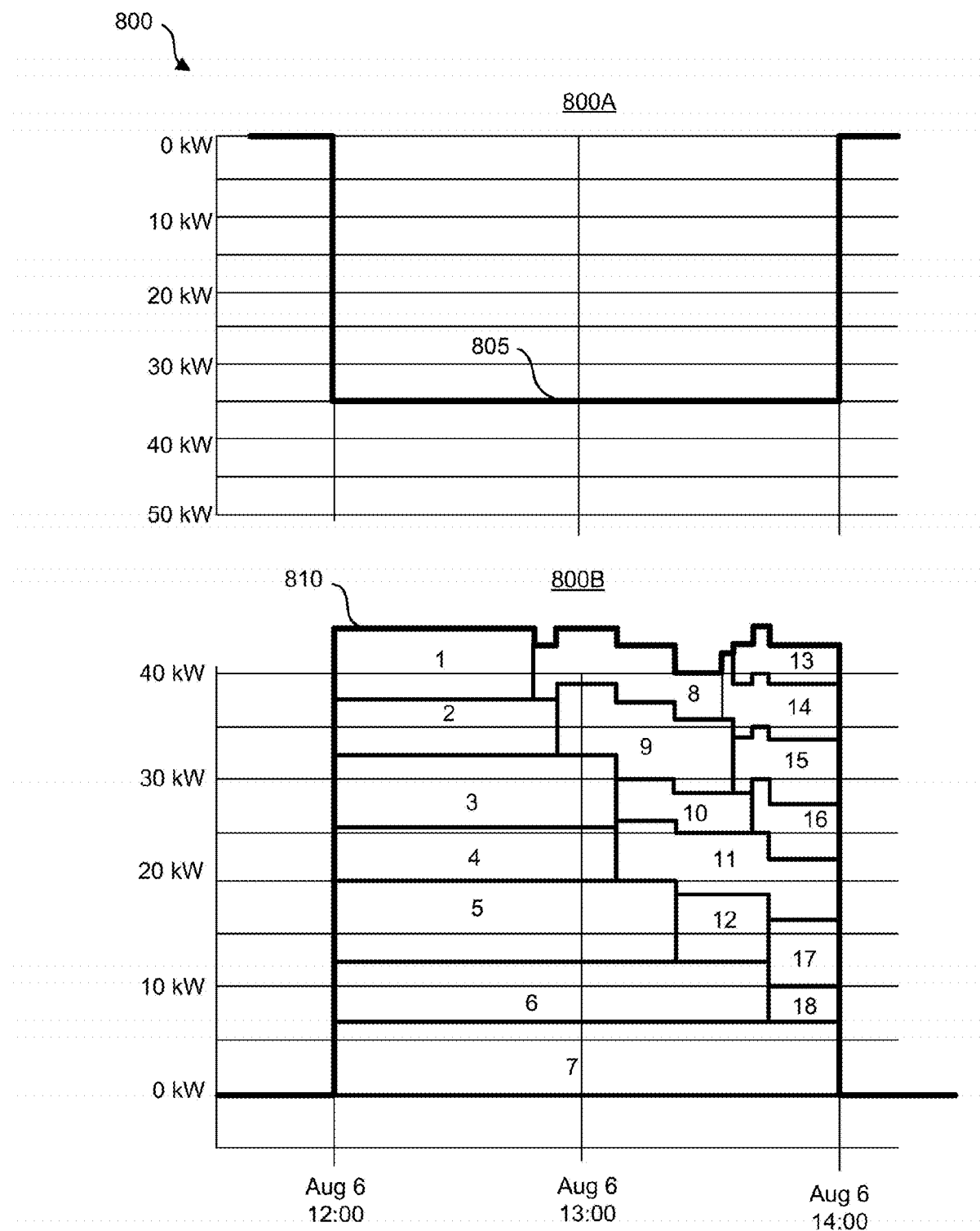
FIG. 8 is a diagram illustrating an event request and a corresponding dispatch solution.

In diagram 800 of FIG. 8, the upper portion 800A illustrates a schematic of an event request and the lower portion 800B illustrates a corresponding dispatch solution. In particular, the upper portion 800A of FIG. 8 illustrates an event request 805 of 35 kW (Y axis) for a period of two hours between 12:00 and 14:00 for the sample day of August 6 (X axis). The lower portion 800B of FIG. 8 graphically illustrates the combination of 18 different and unique capacity profiles, each represented by a dispatch "brick", which are stacked and sequenced to meet the dispatch request. Each brick represents the unique capacity (height of the brick associated with the Y axis) and predicted duration of control capability (length of the brick associated with the X axis). Total capacity is shown at 810.

Figure 9:
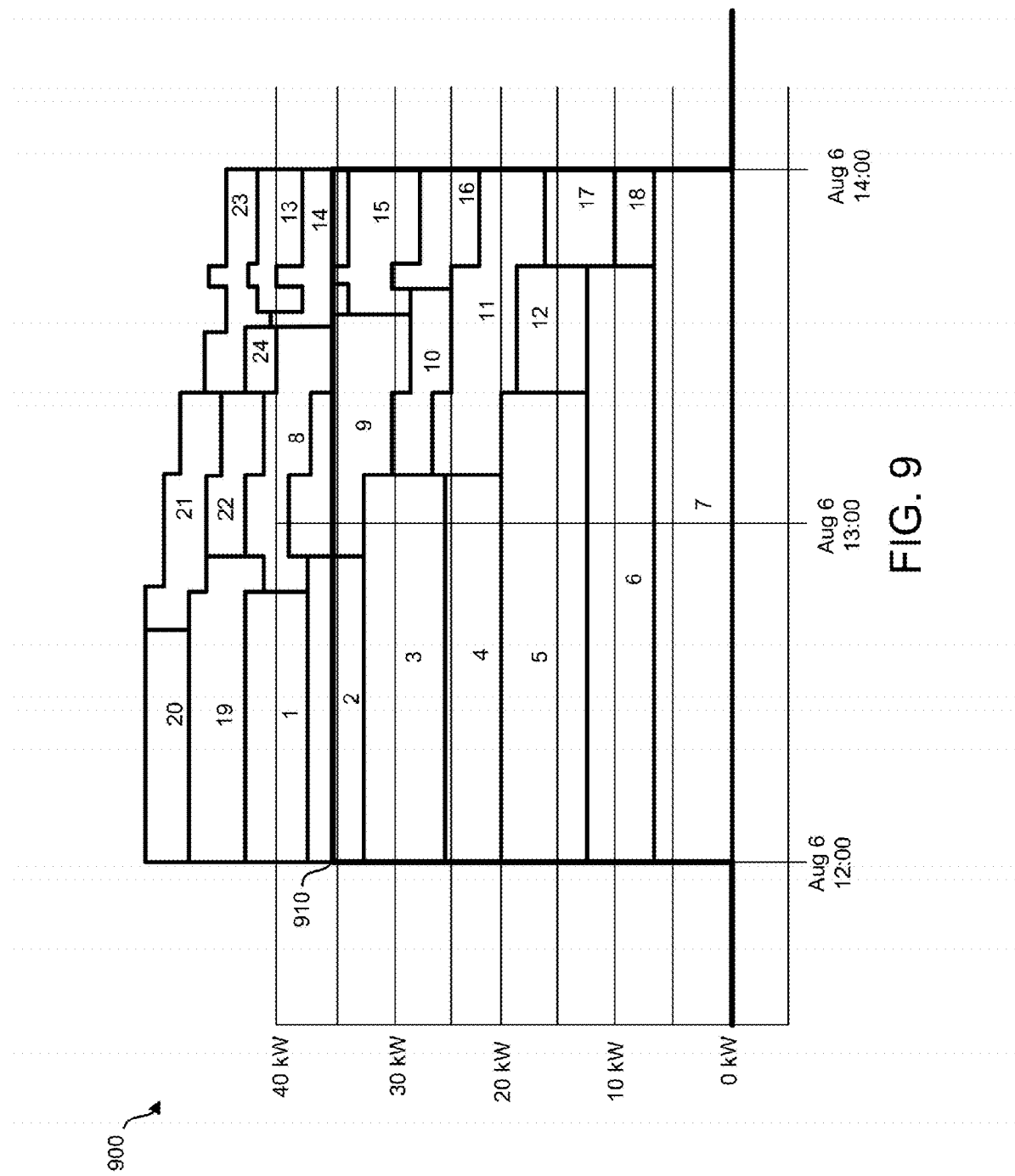
FIG. 9 is a diagram illustrating over-scheduling of resources derived from the temperature utilization models.

Diagram 900 of FIG. 9 illustrates over scheduling of resources 160 by the platform 120 derived from the temperature utilization models and other operating considerations to assure the required aggregate capacity is maintained even in the event of unpredicted actions or failure of any one resource within the stack. Considering the utilization models at the air temperature during this event, more resources 160 than required are reviewed, sequenced and allocated for potential participation in the event. These additional resources can be described as an excess capacity margin or operating reserve which is managed by the pre-event auditor 122 running prior to the dispatch of each resource 160 within the event. The auditor 122 cancels or reschedules those resources which will not immediately participate. The bricks numbered in red (i.e., 19-24) indicate the bricks that are held as operating reserve or have been removed or rescheduled by the pre-event auditor 122 to maintain the desired DSM requirement 905. The platform 120 can also provide mechanisms to ramp-in and ramp-out of DSM events (by controlling individual loads "OFF" or "ON" in measured sequence rather than all simultaneously at the start of an event). Ramp rate can be characterized as a defined allocation of time prior to the start of an event to affect control across multiple resources. For example, a 3 minute ramp rate would allow 3 minutes for the gradual transition of many resources 160 to their desired operating state to assure that all resources in aggregate are in the proper state for the requested start time of the DSM event.

Figure 10:
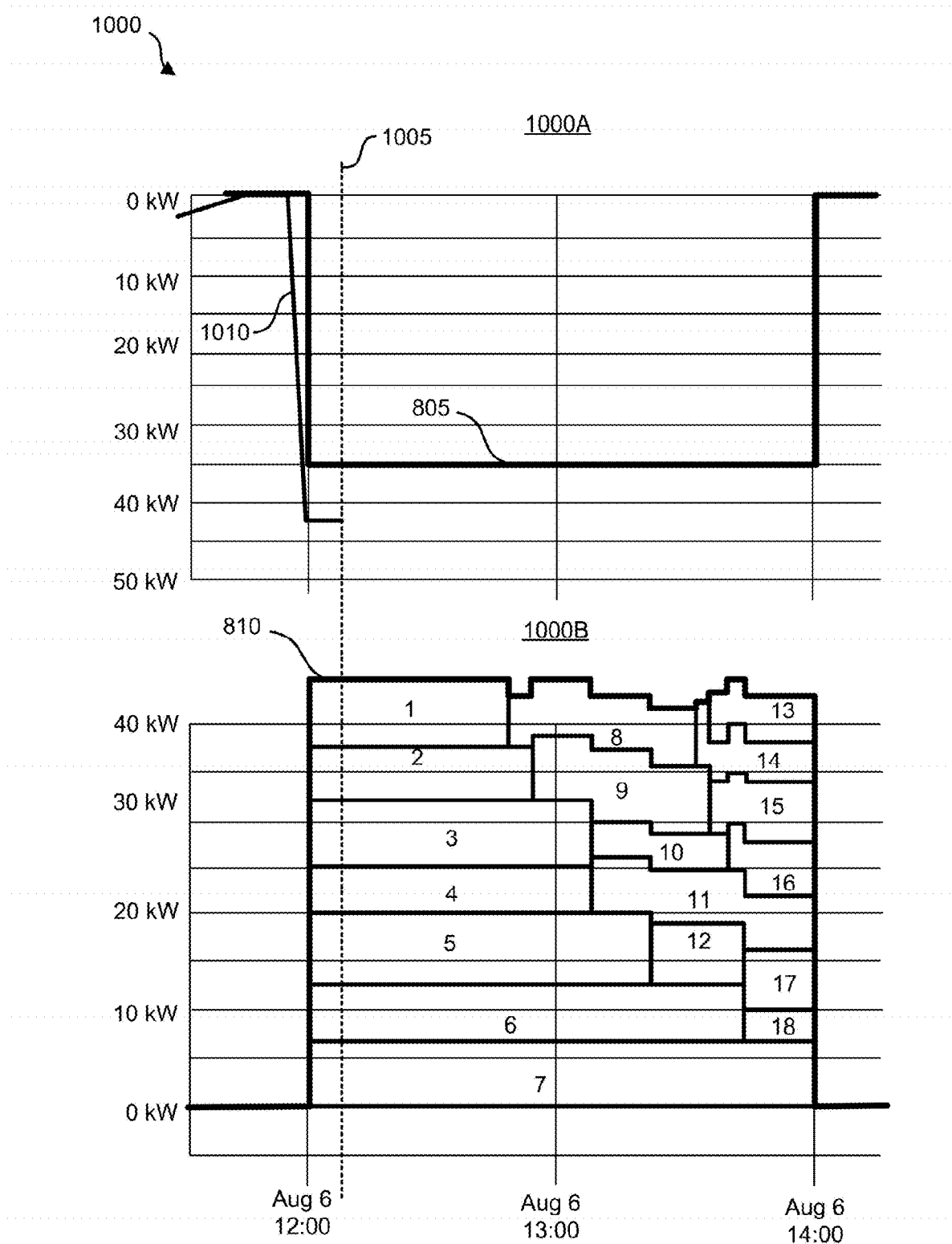
FIG. 10 is a diagram illustrating performance at an initial stage of an event.

Diagram 1000 of FIG. 10 illustrates the initial stage of monitoring an event. A point in time may be represented by the dashed line 1005. The blue line 1010 illustrated in the upper portion of the graph shows the performance of the event observed up to that point in time. Lower portion 1000B illustrates a corresponding solution. At any point in time, the platform 120 acquires the status of each resource as monitored in real time at the site and determines from its state whether it is consuming load "ON" or contributing to the load shed event "OFF".

At the start of this example of FIGS. 8-13, only the resources 160 represented by bricks 1-7 are called to operate at the beginning of the event. They represent the capacity of the dispatch request plus an operating margin. Verification at the time of event includes the observation of a state change ("ON" to "OFF") for each controllable resource 160. Any one or many of the controllable resources 160 shown in these examples may also be a generation or energy storage resource. The status of each of these seven resources is monitored by the control units 140 for the dispatch of bricks 1-7 for satisfactory response. Monitoring continues in real time for the site and can be reported to the platform 120 in real time or upon acceptable intervals (depending upon the communications system selected by the utility; typically found to be 30 to 60 second intervals) to assure the existing resources remain in the "OFF" or other desired state and are represented across the event as seen by the solid blue line 1010 in the upper portion 1000A of diagram 1000 of FIG. 10.

Figure 11:
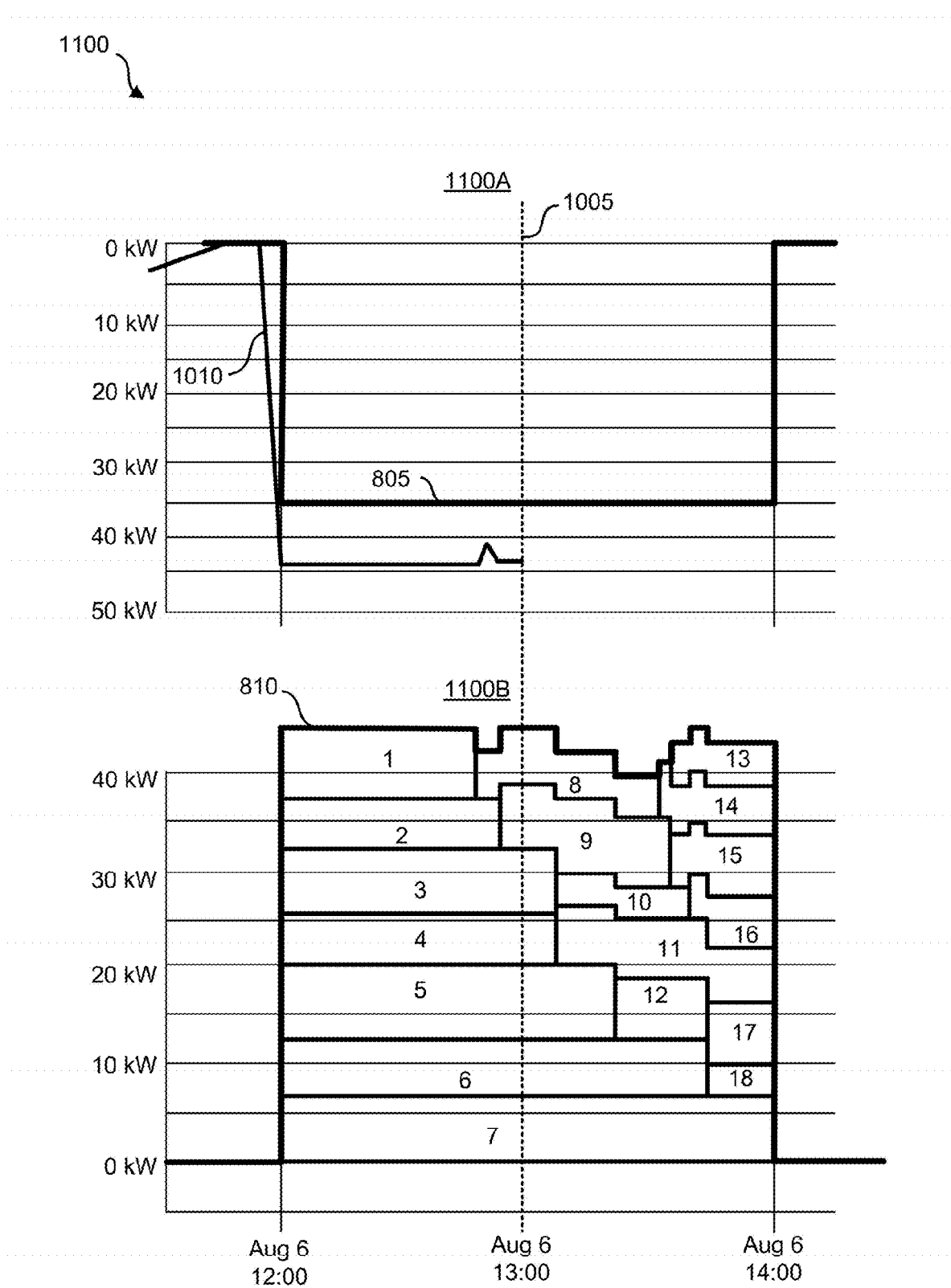
FIG. 11 is a diagram illustrating performance during an event.

The duration of a requested event can exceed the allowable or effective dispatch duration of any single resource 160. Thus the schematic of the accumulated schedules can be represented as a sequence of bricks strategically placed to fulfill the request. In this example, bricks 1 and 2 had known dispatch durations of 40 and 50 minutes; less than the desired dispatch request of two hours. In diagram 1100 of FIG. 11, upper portion 1100A of the graph shows the performance of the event observed up to that point in time. Lower portion 1100B illustrates a corresponding dispatch solution. FIG. 11 illustrates how two additional resources represented by bricks, 8 and 9 have been added to the portfolio to maintain the dispatch request. The total capacity delivered can be seen to also change during the transition between bricks, but remains within the operating reserve margin.

In this example the duration of bricks 1 and 2 were known or predicted and the platform 120 must initiate control requests to corresponding control units 140 for supplemental bricks in advance of need to allow for overlapping start and stop of bricks. The platform 120 can also manage other factors including time to full state change and other considerations to assure at any point in time there are adequate resources accumulated to deliver the desired capacity of the DSM event.

The real time capacity monitoring as provided by the platform 120 can include the ability to sense and respond to the loss of a resource 160. It is this type of real time monitoring which can be used for system-wide feedback and rescheduling algorithms. When a participating resource 160 no longer behaves as expected, the control unit 150, realizes this loss, reports to the platform 120, which calculates future loss, and aggregates it into a resource loss profile. The resource loss profile can be visualized as having individual and aggregate profiles that have thresholds that trigger point rescheduling. The platform 120 can acquire additional resources to ensure compliance to the original requested DSM event. The auditor 122 can trigger acquisition of replacement resources when the aggregate profile surpasses a given threshold (typically associated with the over schedule requirements).

In some variations, the platform 120 and/or the control unit 150 can implement or otherwise utilize self-learning methodologies so that it can modify dispatch model parameters derived from their prior behavior, or changes in performance over time. In this way the scheduling and resulting performance of the dispatch model continuously and adaptively improves. In particular, historical data obtained from control units 150 across a plurality of customer premises 140 can be used to train a machine learning model or models. Such models can use methodologies such as neural networks, support vector machines, regression models and the like.

Figure 12:
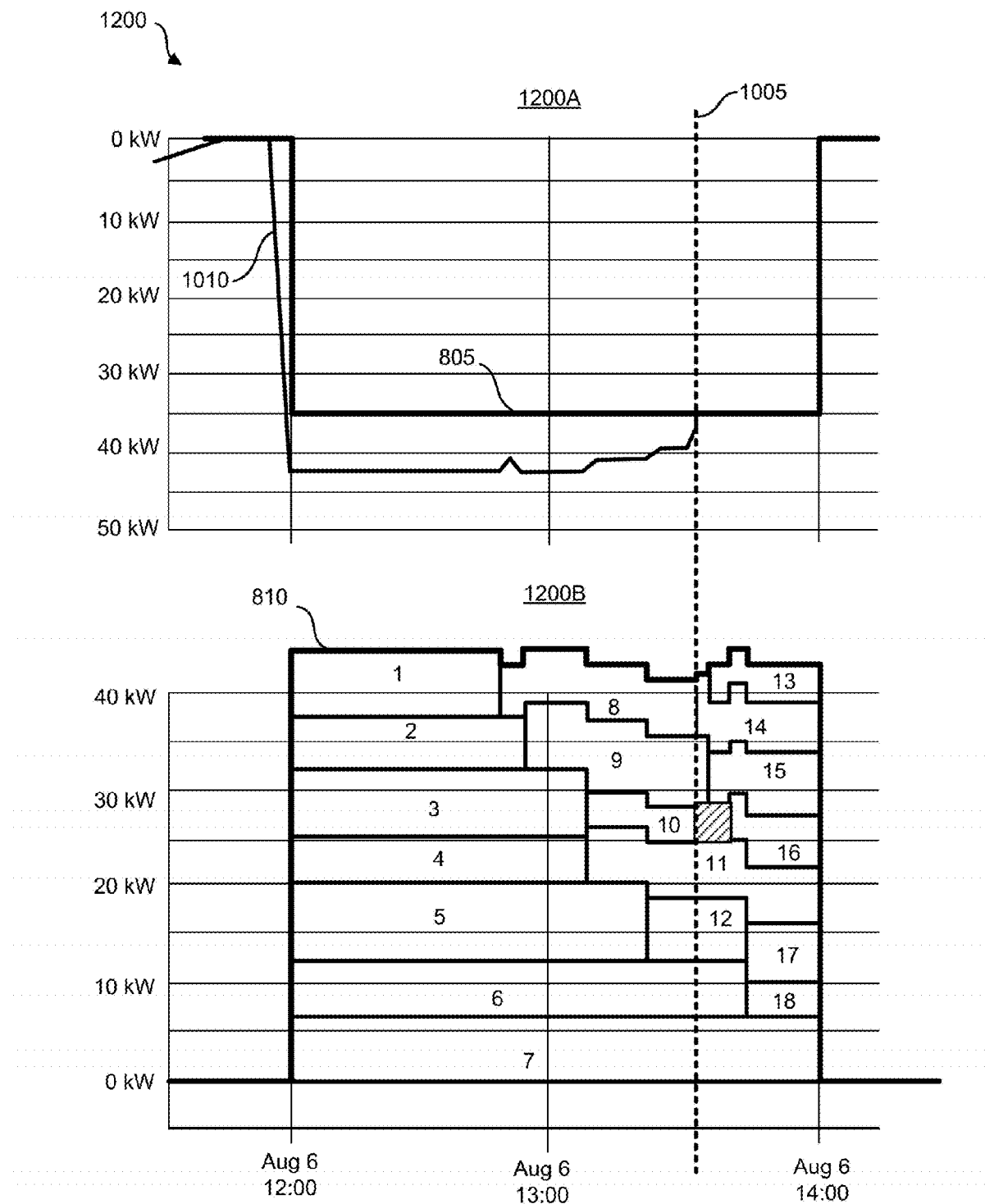
FIG. 12 is a diagram illustrating performance during an event in the case of a loss of a resource.

Diagram 1200 of FIG. 12 illustrates the ongoing sequence of adding resources 160, or bricks, to satisfy a dispatch event. In particular, diagram 1200 illustrates activity in the scenario in which one single resource is found not to be contributing to the event. In this example, brick 10 in lower portion 1200B has been observed to change state prior to the intended duration by any of several factors: failure of the device to respond to a control request, unanticipated operating status (i.e.: already "OFF"), the opt-out or over-ride by a customer which prevents the engagement of this resource, any variation to predictive modeling such as ambient temperature different than expects, or any combination of external modifiers. The corresponding performance of the event is shown in the upper portion 1200A.

The platform 120 can include operating margins that, in turn, can allow for variances in performance of each individual resource 160, including total loss of a contributing resource 160 and additional bricks are called by the auditor 122 in real time when needed (i.e., when a threshold is exceeded, etc.).

Figure 13:
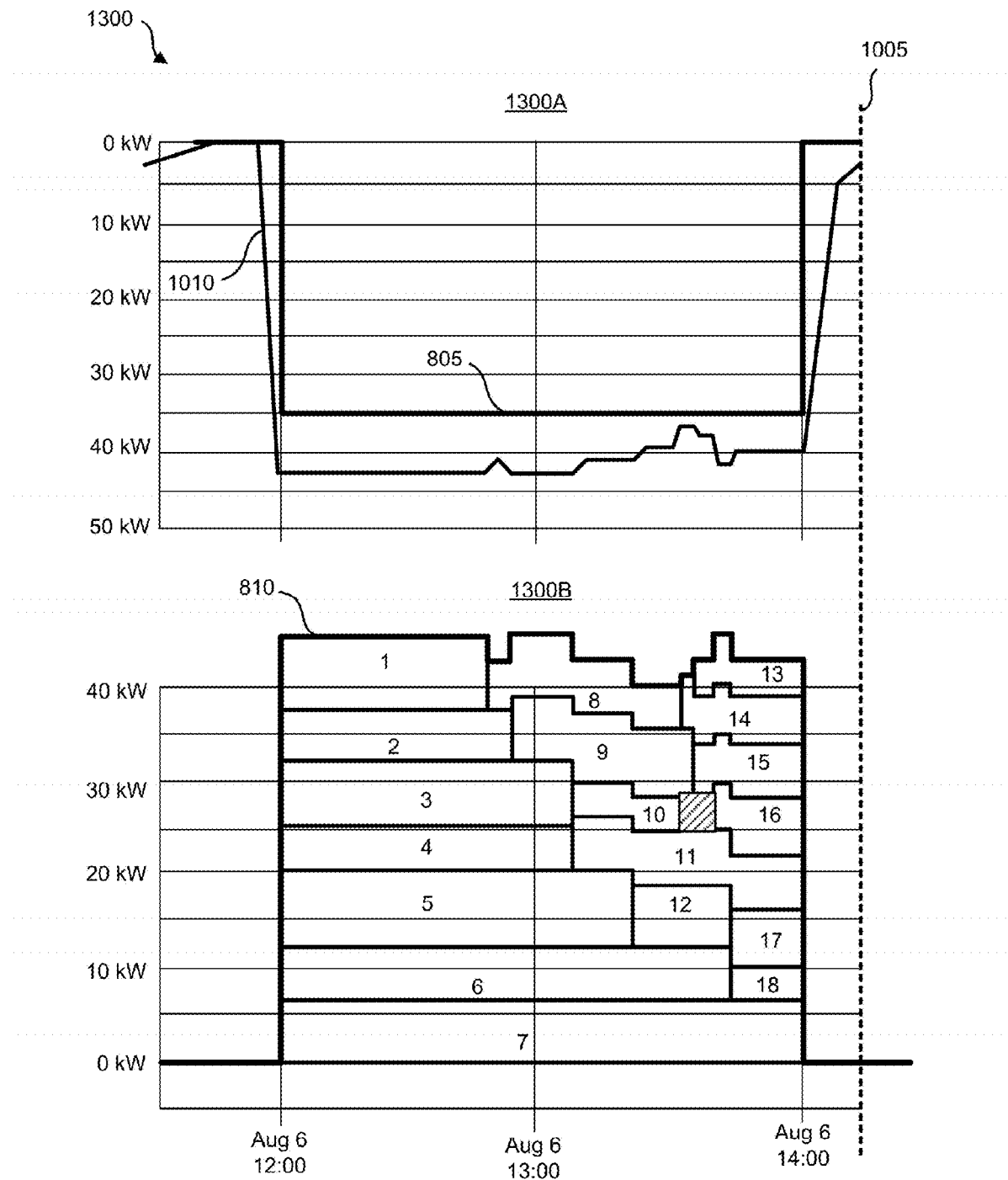
FIG. 13 is a diagram illustrating performance at an end of an event.

FIG. 13 is a diagram 1300 that demonstrates the monitoring post event schematically representing the rise in load demand (shown at upper portion 1300A) as the resources 160 participating in the DSM event return (shown at lower portion 1300B) to their normal state (ON being to resume to the consumption of power).

It will be appreciated that the subject matter herein can be applied to a wide variety of resources 160. In addition to those described above, resources can include chillers, namely, systems that chill water for distribution through pipes within a building in contrast to a residential HVAC system where the cooling coil is centralized and ducts are used distribute the air. In addition, for some customer buildings 140, the platform can differentiate among various resources 160 used within a single room/space at the customer building 140. For example, the platform 120 can characterize common airspace, namely a large room/space served by more than one HVAC unit without dividers or separation between the air handling units. The platform 120 can also characterize a common header system in which multiple cooling compressors deliver into one large pipe as found in a chiller. It will also be appreciated that the resources 160 are sometimes include a single or multiple devices which, in turn, are characterized as equipment or mechanisms (e.g., lighting or HVAC units) which, by a function of their operating status, create the load under control within a customer building 140. It will also be appreciated that a resource 160 can be anything that consumes or delivers real or reactive energy for any period of time, including resources which may draw from one phase of an electrical system and simultaneously deliver to another, thereby serving a need of the utility operator and improving the operation and utilization of the electrical grid.

In some cases, the operator of the customer building 140 can cause the control units to be manually overridden. Such a manual override can occur when the customer can intervene and change an automated control command being delivered to a load. For example, the platform 120 can send a signal to a control unit 150 to turn load "OFF" and the customer may turn it back "ON" (either via the localized control unit 150 or via a different mechanism). The real time monitoring of the resource 160 by the control unit 150 can be communicated to the platform 120 which then monitors accumulated losses and dispatches other resources to maintain the aggregate capacity requested by the utility operator.

Figure 14:
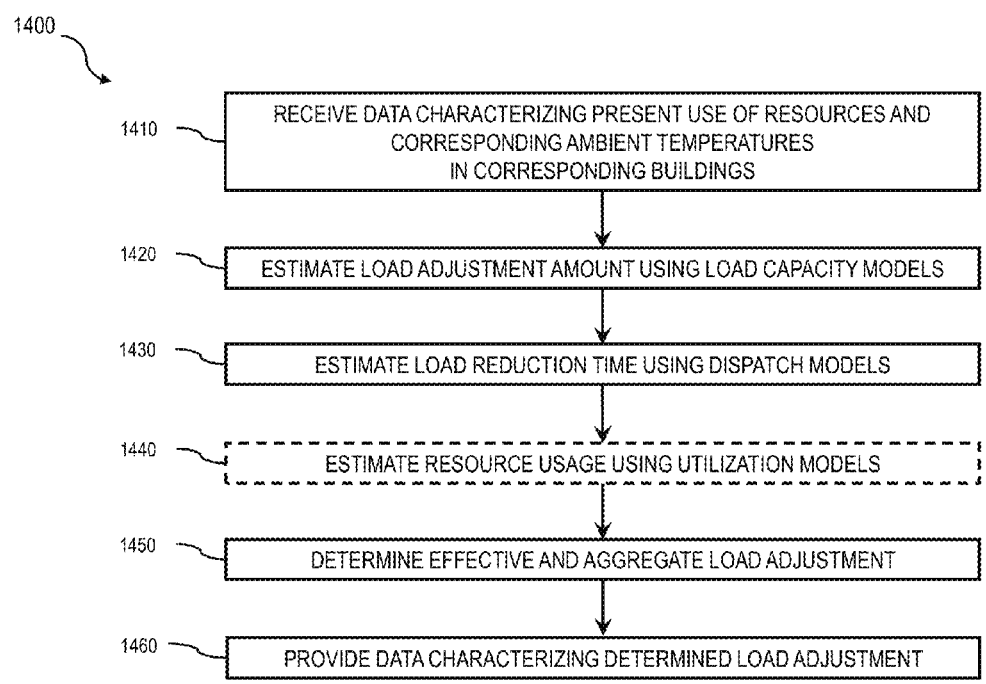
FIG. 14 is a process flow diagram illustrating real time capacity monitoring for measurement and verification of demand side management.

FIG. 14 is a process flow diagram 1400 in which, at 1410, data is received that characterizes the present operating status of each of a plurality of load consuming resources within a plurality of buildings and ambient temperature within such buildings. Each resource is remotely controllable in relation to its load consuming activities (e.g., by a control unit, etc.). Thereafter, at 1420, it is first estimated, for each resource using one of a plurality of load capacity models and derived from the received data, an amount of potential load adjustment. The load capacity models are derived from coordinating testing of historical observations demonstrating how consumed load varies for each resource due to changes in ambient air temperature and humidity and building occupancy. In addition, at 1430, it is second estimated, for each resource using one of a plurality of dispatch models and derived from the received data, a length of time that an amount of load being consumed by the resource can be reduced. The dispatch models are correlated to changes in ambient air temperature and humidity. Optionally, at 1440, it is third estimated, for each resource using one of a plurality of utilization models and derived from the received data, an amount of time that each resource will be used over a period of time. Next, at 1450, using the first estimating, the second estimating, and optionally the third estimating, an effective and aggregate load adjustment for the resources is determined. Data characterizing such determination can then, at 1460, be provided (e.g., displayed, stored, loaded into memory, transmitted to a remote computing system, etc.).

The subject matter herein can be utilized in connection with some or all of the subject matter in co-pending U.S. patent application Ser. No. 13/803,816, entitled: "Grid Optimization Resource Dispatch Scheduling", and published as U.S. Pat. App. Pub. No. 20130289772, the contents of which are hereby fully incorporated by reference.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable by a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running within the respective computers and having a client-server relationship to each other. In addition, computing devices (i.e., devices having at least one data processor and memory, etc.) can communicate in a peer to peer fashion.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented within a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the terms "based upon" and "derived from" within the claims is intended to mean, "based at least in part on," such that an unrecited feature or element is also permissible.

The subject matter described herein can be embodied in systems, apparatus, methods, and/or articles of any desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving data characterizing a present operating status of each of a plurality of load consuming resources within a plurality of buildings and ambient temperature within such buildings, each resource being remotely controllable in relation to its load consuming activities;
first estimating, for each resource using one of a plurality of load capacity models and derived from the received data, an amount of potential load adjustment, the load capacity models being derived from coordinating testing of historical observations demonstrating how consumed load varies for each resource due to changes in ambient air temperature and building occupancy;
second estimating, for each resource using one of a plurality of dispatch models and derived from the received data, a length of time that an amount of load being consumed by the resource can be reduced, the dispatch models being correlated to changes in ambient air temperature;
determining an effective and aggregate load adjustment for the resources derived from the first estimating and the second estimating;
determining, derived from determined dispatch durations, which of the resources should be controlled so as to alter aggregate load;
transmitting data to at least one control unit to effect the effective and aggregate load adjustment at the determined resources; and
wherein the at least one control unit comprises at least one processor and memory storing instructions causing data to be transmitted to one or more connected resources to cause a load consuming profile of such resources to selectively change.

2. The method of claim 1, wherein the at least one control unit generates the data characterizing the present operating status of each of the plurality of load consuming resources.

3. The method of claim 1, further comprising:
third estimating, for each resource using one of a plurality of utilization models and derived from the received data, an amount of time that each resource will be used over a period of time;
wherein a determined effective dispatch duration for each resource is further derived from the third estimating.

4. The method of claim 1, wherein at least one of the receiving, first estimating, second estimating, determining or providing is implemented by at least one data processor forming part of at least one machine.

5. The method of claim 1, wherein the providing comprises at least one of: displaying the data characterizing the effective and aggregate load adjustment for the resources, storing the data characterizing the effective and aggregate load adjustment for the resources, transmitting the data characterizing the effective and aggregate load adjustment for the resources to a remote computing system, or loading the data characterizing the effective and aggregate load adjustment for the resources into memory.

6. The method of claim 1, wherein the received data further comprises humidity data within such buildings, wherein at least one of the load capacity models or the dispatch models uses the humidity data for estimations.

7. A system comprising:
at least one data processor; and
memory storing instructions which, when executed by the at least one data processor, result in operations comprising:
receiving data characterizing a present operating status of each of a plurality of load consuming resources within a plurality of buildings and ambient temperature within such buildings, each resource being remotely controllable in relation to its load consuming activities;
first estimating, for each resource using one of a plurality of load capacity models and derived from the received data, an amount of potential load adjustment, the load capacity models being derived from coordinating testing of historical observations demonstrating how consumed load varies for each resource due to changes in ambient air temperature and building occupancy;
second estimating, for each resource using one of a plurality of dispatch models and derived from the received data, a length of time that an amount of load being consumed by the resource can be reduced, the dispatch models being correlated to changes in ambient air temperature;
determining an effective and aggregate load adjustment for the resources derived from the first estimating and the second estimating;
determining, derived from determined dispatch durations, which of the resources should be controlled so as to adjust load;
transmitting data to at least one load control unit to effect the effective and aggregate load adjustment at the determined resources; and
wherein the at least one control unit comprises at least one processor and memory storing instructions causing data to be transmitted to one or more connected resources to cause a load consuming profile of such resources to selectively change.

8. The system of claim 7, wherein the at least one control unit generates at least a portion of the data characterizing the present operating status of each of the plurality of load consuming resources.

9. The system of claim 7, wherein the operations further comprise:
third estimating, for each resource using one of a plurality of utilization models and derived from the received data, an amount of time that each resource will be used over a period of time;
wherein a determined effective dispatch duration for each resource is further derived from the third estimating.

10. The system of claim 7, wherein the providing comprises at least one of: displaying the data characterizing the effective and aggregate load adjustment for the resources, storing the data characterizing the effective and aggregate load adjustment for the resources, transmitting the data characterizing the effective and aggregate load adjustment for the resources to a remote computing system, or loading the data characterizing the effective and aggregate load adjustment for the resources into memory.

11. The system of claim 7, wherein the received data further comprises humidity data within such buildings, wherein at least one of the load capacity models or the dispatch models uses the humidity data for estimations.

12. A non-transitory computer program product storing instructions which, when executed by at least one data processor forming part of at least one computing system, result in operations comprising:

receiving data characterizing a present operating status of each of a plurality of load consuming resources within a plurality of buildings and ambient temperature within such buildings, each resource being remotely controllable in relation to its load consuming activities;

first estimating, for each resource using one of a plurality of load capacity models and derived from the received data, an amount of potential load adjustment, the load capacity models being derived from coordinating testing of historical observations demonstrating how consumed load varies for each resource due to changes in ambient air temperature and building occupancy;

second estimating, for each resource using one of a plurality of dispatch models and derived from the received data, a length of time that an amount of load being consumed by the resource can be reduced, the dispatch models being correlated to changes in ambient air temperature;

determining an effective and aggregate load adjustment for the resources derived from the first estimating and the second estimating;

determining, derived from determined dispatch durations, which of the resources should be controlled so as to adjust load;

transmitting data to at least one load control unit to effect the effective and aggregate load adjustment at the determined resources; and wherein the at least one control unit comprises at least one processor and memory storing instructions causing data to be transmitted to one or more connected resources to cause a load consuming profile of such resources to selectively change.

13. The computer program product of claim 12, wherein the at least one control unit generates at least a portion of the data characterizing the present operating status of each of the plurality of load consuming resources.

14. The computer program product of claim 12, wherein the operations further comprise:

third estimating, for each resource using one of a plurality of utilization models and derived from the received data, an amount of time that each resource will be used over a period of time;

wherein a determined effective dispatch duration for each resource is further derived from the third estimating.

15. The computer program product of claim 12, wherein the providing comprises at least one of: displaying the data characterizing the effective and aggregate load adjustment for the resources, storing the data characterizing the effective and aggregate load adjustment for the resources, transmitting the data characterizing the effective and aggregate load adjustment for the resources to a remote computing system, or loading the data characterizing the effective and aggregate load adjustment for the resources into memory.

16. The computer program product of claim 12, wherein the received data further comprises humidity data within such buildings, wherein at least one of the load capacity models or the dispatch models uses the humidity data for estimations.

* * * * *